United States Patent
Kawada et al.

(10) Patent No.: US 11,496,036 B2
(45) Date of Patent: Nov. 8, 2022

(54) VALVE DEVICE

(71) Applicant: DENSO CORPORATION, Kariya (JP)

(72) Inventors: Shinji Kawada, Kariya (JP); Seiji Tateishi, Kariya (JP); Hikaru Otsuka, Kariya (JP); Hiroto Inoue, Kariya (JP); Shin Kuwata, Kariya (JP); Tetsuya Ito, Kariya (JP); Shinji Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 37 days.

(21) Appl. No.: 17/110,055

(22) Filed: Dec. 2, 2020

(65) Prior Publication Data

US 2021/0116046 A1    Apr. 22, 2021

Related U.S. Application Data

(63) Continuation of application No. PCT/JP2019/022263, filed on Jun. 5, 2019.

(30) Foreign Application Priority Data

Jun. 7, 2018 (JP) .............................. JP2018-109447

(51) Int. Cl.
   *F16K 31/04* (2006.01)
   *H02K 49/10* (2006.01)
   (Continued)

(52) U.S. Cl.
   CPC ........... *H02K 49/108* (2013.01); *F16H 25/20* (2013.01); *F16K 31/04* (2013.01); *F16K 31/08* (2013.01);
   (Continued)

(58) Field of Classification Search
   CPC ...... F16K 31/04; F16K 31/041; F16K 31/043; F16K 31/047; F16K 31/08; F16K 31/082;
   (Continued)

(56) References Cited

U.S. PATENT DOCUMENTS 3,378,710 A * 4/1968 Martin, Jr. ........... H02K 49/102
                                                310/104
4,593,881 A * 6/1986 Yoshino ................ F25B 41/35
                                                251/282
(Continued)

FOREIGN PATENT DOCUMENTS

CN     1148678 A    4/1997
JP     S59103092 A  6/1984
(Continued)

OTHER PUBLICATIONS

U.S. Appl. No. 17/110,119, filed Dec. 2, 2020, Shinji Kawada et al.

*Primary Examiner* — Matthew W Jellett
(74) *Attorney, Agent, or Firm* — Harness, Dickey & Pierce, P.L.C.

(57) ABSTRACT

A valve device includes a valve, a drive device, and a transmission unit. A valve changes a flow mode of refrigerant that flows in a circulation path of a refrigeration cycle device. The transmission unit includes a driving-side rotary body, a magnetic transmission member, and a driven-side rotary body. The driving-side rotary body includes multiple magnetic magnet poles in a rotational direction. The magnetic transmission member includes multiple magnetic transmission bodies which are configured to be magnetized by the magnetic magnet poles. The driven-side rotary body includes multiple magnetic magnet poles in a rotational direction. The driven-side rotary body rotates in response to a rotary motion of the multiple magnetic magnet poles of the driving-side rotary body via the magnetic transmission body. The number of the magnetic magnet poles and the number of the magnetic transmission bodies are different from each other. The rotation is transmitted from the driving-side rotary body to the driven-side rotary body via the magnetic transmission member in a non-contact manner.

11 Claims, 4 Drawing Sheets

(51) Int. Cl.
*F16H 25/20* (2006.01)
*F16K 31/08* (2006.01)
*F16K 31/50* (2006.01)
*F16K 31/53* (2006.01)
*H02K 7/06* (2006.01)
*H02K 7/116* (2006.01)
*H02K 26/00* (2006.01)
*F25B 41/34* (2021.01)

(52) U.S. Cl.
CPC .............. *F16K 31/50* (2013.01); *F16K 31/53* (2013.01); *F25B 41/34* (2021.01); *H02K 7/06* (2013.01); *H02K 7/116* (2013.01); *H02K 26/00* (2013.01); *F16H 2025/2075* (2013.01)

(58) Field of Classification Search
CPC ...... F16K 31/088; F16K 31/35; F16K 31/105; F16K 31/50; F16K 31/53; H02K 49/108; H02K 7/06; H02K 7/14; H02K 7/116; H02K 26/00; H02K 2211/03; F25B 41/34; F25B 41/35
See application file for complete search history.

(56) References Cited

U.S. PATENT DOCUMENTS

| | | | | |
|---|---|---|---|---|
| 6,163,095 | A | * | 12/2000 | Shams ................ H02K 49/108 310/104 |
| 6,460,567 | B1 | * | 10/2002 | Hansen, III ............. F16K 31/04 137/625.48 |
| 8,281,607 | B2 | * | 10/2012 | Dolin ...................... F25B 41/34 62/212 |
| 9,816,639 | B2 | * | 11/2017 | Suzuki ................. B60H 1/3213 |
| 10,352,475 | B2 | * | 7/2019 | Uehara ............... F16K 37/0083 |
| 2012/0187202 | A1 | * | 7/2012 | Suzuki ................... F25B 41/35 236/92 B |
| 2018/0066580 | A1 | * | 3/2018 | Fritz ......................... F01D 5/00 |
| 2018/0202570 | A1 | * | 7/2018 | Lv ......................... F16K 31/508 |

FOREIGN PATENT DOCUMENTS

| | | |
|---|---|---|
| JP | S6146374 U | 3/1986 |
| JP | H08128553 A | 5/1996 |
| JP | H08312821 A | 11/1996 |
| JP | H1113919 A | 1/1999 |
| JP | 2007010015 A | 1/2007 |
| JP | 2009168101 A | 7/2009 |

* cited by examiner

VALVE DEVICE

CROSS REFERENCE TO RELATED APPLICATION

The present application is a continuation application of International Patent Application No. PCT/JP2019/022263 filed on Jun. 5, 2019, which designated the U.S. and claims the benefit of priority from Japanese Patent Application No. 2018-109447 filed on Jun. 7, 2018. The entire disclosures of all of the above applications are incorporated herein by reference.

TECHNICAL FIELD

The present disclosure relates to an electric valve device.

BACKGROUND

A valve device such as a four-way valve device has been used in a refrigeration cycle device. The valve device may include an electric drive unit such as an electric motor.

SUMMARY

According to an aspect of the present disclosure, a valve device includes a valve, a drive device configured to drive the valve, and a transmission unit. The valve changes a flow mode of refrigerant that flows in a circulation path of a refrigeration cycle device.

BRIEF DESCRIPTION OF THE DRAWINGS

The above and other objects, features and advantages of the present disclosure will become more apparent from the following detailed description made with reference to the accompanying drawings. In the drawings:

In FIG. 3, (*a*) to (*c*) are plan views showing a magnetic speed reduction unit (driving-side rotary body, magnetic transmission member, and driven-side rotary body); and In FIG. 4, (*a*) to (*c*) are exploded explanatory views showing an operation of the magnetic speed reduction unit.

DETAILED DESCRIPTION

As follows, examples of the present disclosure will be described.

According to an example of the present disclosure, a valve device such as a four-way valve device used in a refrigeration cycle device includes a motor as an electric drive unit and a speed reduction unit that decelerates and increases a torque of a rotary motion of a rotor of a motor. This valve device drives a valve body via an output shaft of the speed reduction unit.

According to an example of the present disclosure, a gear mechanism such as a planetary gear mechanism is used. In the gear mechanism, multiple gears are meshed with each other, and therefore, sound is caused from the meshing portion at the time of drive transmission. On the other hand, the present inventor conceives a highly quiet valve device that would suppress the occurrence of sound in the drive transmission.

According to an example of the present disclosure, a valve device includes a valve, a drive device configured to drive the valve, and a transmission unit. The valve changes a flow mode of refrigerant that flows in a circulation path of a refrigeration cycle device. The drive device includes an electric drive unit as a drive source. The transmission unit is provided in a drive transmission path that is from the electric drive unit to the valve and is configured to change speed of rotation caused by driving of the electric drive unit. The transmission unit is a magnetic variable speed unit including a driving-side rotary body, a magnetic transmission member, and a driven-side rotary body. The driving-side rotary body is configured to rotate by driving of the electric drive unit, the drive-side rotary body includes a plurality of magnetic magnet poles in a rotational direction. The magnetic transmission member includes multiple magnetic transmission bodies which are configured to be magnetized by the magnetic magnet poles. The multiple magnetic transmission bodies are arranged to be apart from each other in the rotational direction. The driven-side rotary body includes multiple magnetic magnet poles in a rotational direction. The driven-side rotary body rotates in response to a rotary motion of the multiple magnetic magnet poles of the driving-side rotary body via the magnetic transmission body. A number of the magnetic magnet poles and a number of the magnetic transmission bodies are different from each other in the magnetic transmission unit to enable the magnetic transmission unit to reduce or increase in the speed of the rotation. The valve device is configured to transmit the rotation from the driving-side rotary body to the driven-side rotary body via the magnetic transmission member in a non-contact manner.

According to this example, the number of the magnetic magnet poles and the number of the magnetic transmission bodies are different from each other in the magnetic transmission unit to enable the magnetic transmission unit and to reduce or increase in the speed of the rotation. Further, the configuration enables to transmit the driving force from the driving-side rotary body to the driven-side rotary body in the non-contact manner via the magnetic transmission member, and therefore, the drive transmission would be significantly quiet. That is, the configuration enables to provide the valve device with high quietness.

Hereinafter, an embodiment of a valve device will be described with reference to the drawings. In the drawings, a part of the configuration may be exaggerated or simplified for convenience of description. In addition, a dimensional ratio of each component may be different from the actual dimensional ratio.

Figure 1:
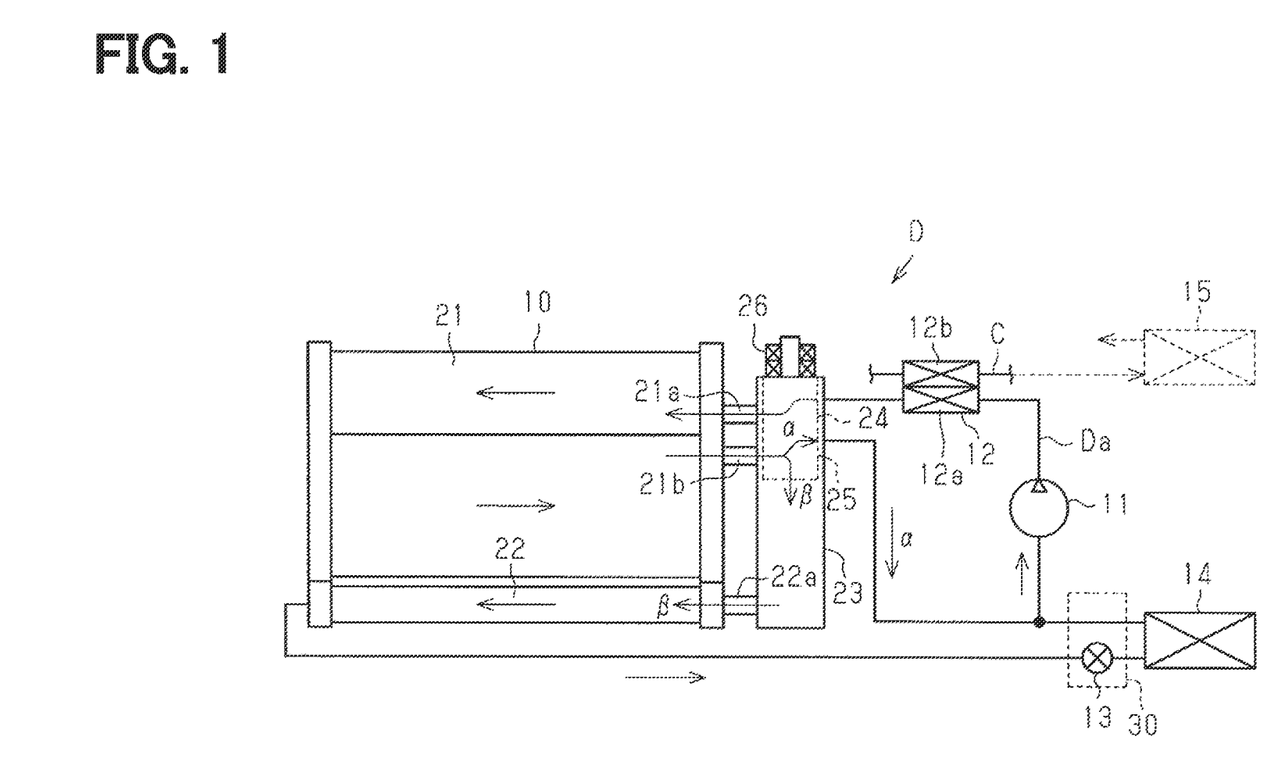
FIG. 1 is a schematic diagram showing a refrigeration cycle device including a valve device according to an embodiment.

As shown in FIG. 1, a heat exchanger 10 of the present embodiment is used for a refrigeration cycle device D (heat pump cycle device) for air conditioning of an electric vehicle (hybrid vehicle, EV vehicle, and the like). The vehicle air conditioning device 1 includes a refrigeration cycle 3 and is configured to switch between a cooling mode that blows air cooled by using an evaporator 14 into a passenger compartment and a heating mode that blows air warmed by using a heater core 15 into the passenger compartment. Further, a refrigerant circulation circuit Da of the refrigeration cycle device D is configured to switch between a circulation circuit corresponding to the cooling mode (cooling circulation path α) and a circulation circuit corresponding to the heating mode (heating circulation path β). Herein, HFC refrigerant or HFO refrigerant, for example, may be used as the refrigerant circulating in the refrigerant circulation circuit Da of the refrigeration cycle device D. Oil for lubricating a compressor 11 is desirably mixed in the refrigerant.

The refrigeration cycle device D includes the compressor 11, a water cooling condenser 12, the heat exchanger 10, an expansion valve 13 as a valve (expansion valve device 30 as a valve device), and the evaporator 14 in the refrigerant circulation circuit Da.

The compressor 11 is an electric compressor arranged in an engine room outside the vehicle interior. The compressor 11 draws and compresses gas phase refrigerant and discharges vapor-phase refrigerant in a superheat state (high temperature and high pressure) to the water cooling condenser 12. The high temperature and high pressure refrigerant discharged from the compressor 11 flows into the water cooling condenser 12. As a compression mechanism of the compressor 11, various compression mechanisms such as a scroll compression mechanism and a vane compression mechanism may be employed. Further, the compressor 11 is configured to control a refrigerant discharge capacity.

The water cooling condenser 12 is a known heat exchanger. The water cooling condenser 12 includes a first heat exchange portion 12a provided on the refrigerant circulation circuit Da and a second heat exchange portion provided on a cooling water circulation circuit C in the cooling water circulation device. The heater core 15 is provided to the circulation circuit C. The water cooling condenser 12 causes heat exchange between the vapor-phase refrigerant flowing in the first heat exchange portion 12a and the cooling water flowing in a second heat exchange portion 12b. That is, in the water cooling condenser 12, cooling water in the second heat exchange portion 12b is heated by heat of the vapor-phase refrigerant in the first heat exchange portion 12a, while the vapor-phase refrigerant in the first heat exchange portion 12a is cooled. Therefore, the water cooling condenser 12 functions as a radiator that dissipates the heat of the refrigerant discharged from the compressor 11 and flowing into the first heat exchange portion 12a to blown air of the vehicle air conditioner via the cooling water and the heater core 15.

The vapor-phase refrigerant that has passed through the first heat exchange portion 12a of the water cooling condenser 12 flows into the heat exchanger 10 through an integrated valve device 24 that will be described later. The heat exchanger 10 is an external heat exchanger arranged on the front side of the vehicle in the engine room outside the vehicle interior. The heat exchanger 10 exchanges heat between the refrigerant flowing inside the heat exchanger 10 and the external air (outside air) blown by a blower fan (not shown).

Specifically, the heat exchanger 10 includes a first heat exchange portion 21 and a second heat exchange portion 22 that functions as a sub-cooler. Further, the heat exchanger 10 is integrally constructed with a liquid reservoir 23, which is connected to the first and second heat exchange portions 21 and 22, and the integrated valve device 24 provided to the liquid reservoir 23. An inflow path 21a and an outflow path 21b of the first heat exchange portion 21 are in communication with the integrated valve device 24. Further, an inflow path 22a of the second heat exchange portion 22 is in communication with the liquid reservoir 23 and the integrated valve device 24.

The first heat exchange portion 21 functions as a condenser or an evaporator according to the temperature of the refrigerant which circulates therein. The liquid reservoir 23 is configured to separate vapor-phase refrigerant and liquid-phase refrigerant, and the separated liquid-phase refrigerant is stored in the liquid reservoir 23. The second heat exchange portion 22 exchanges heat between the liquid phase refrigerant flowing from the liquid reservoir 23 and the external air, thereby to further cool the liquid phase refrigerant to increase a degree of super cooling of the refrigerant. The second heat exchange portion 22 causes the refrigerant after performing the heat exchange to flow to the expansion valve 13. The first heat exchange portion 21, the second heat exchange portion 22, and the liquid reservoir 23 are connected to each other with, for example, bolt fastening and are integrated together.

The integrated valve device 24 includes a valve main body 25 arranged in the liquid reservoir 23 and an electric drive unit 26 for driving the valve main body 25. The integrated valve device 24 is an electric valve device that uses a motor (for example, a stepping motor) for the electric drive unit 26. The integrated valve device 24 forms a heating circulation path α in the heating mode in which the first heat exchange portion 12a of the water cooling condenser 12 and the inflow path 21a of the first heat exchange portion 21 communicate with each other, and at the same time, the outflow path 21b of the first heat exchange portion 21 directly communicates with the compressor 11. Further, the integrated valve device 24 forms a cooling circulation pathway β in the cooling mode in which the first heat exchange portion 12a of the water cooling condenser 12 and the inflow path 21a of the first heat exchange portion 21 communicate with each other, and at the same time, the outflow path 21b of the first heat exchange portion 21 communicate with the compressor 11 through the second heat exchange portion 22, the expansion valve 13, and the evaporator 14. When stopped, the integrated valve device 24 closes all the flow passages. In other words, the integrated valve device 24 operates the valve main body 25 by driving the electric drive unit 26 and switches the operation in accordance with the states of the stop, the heating mode, and the cooling mode.

The expansion valve 13 is a valve that decompresses and expands the liquid phase refrigerant supplied from the heat exchanger 10. In the present embodiment, the expansion valve 13 which is the valve body and the electric drive unit (motor) 42 which is configured to operate the expansion valve 13 and will be described later, are integrated to form the electric expansion valve device 30. The specific configuration of the expansion valve device 30 will be described later. The expansion valve 13 decompresses the liquid-phase refrigerant in the low temperature and high pressure state and supplies the refrigerant to the evaporator 14.

The evaporator 14 is a cooling heat exchanger for cooling conditioned air in the cooling mode. The liquid-phase refrigerant supplied from the expansion valve 13 to the evaporator 14 exchanges heat with air around the evaporator 14 (in the duct of the vehicle air conditioner). This heat exchange causes the liquid-phase refrigerant to be vaporized and causes the air around the evaporator 14 to be cooled. Subsequently, the refrigerant in the evaporator 14 flows out toward the compressor 11 and is compressed again in the compressor 11.

Next, the detailed configuration of the expansion valve device 30 of the present embodiment will be described.

Figure 2:
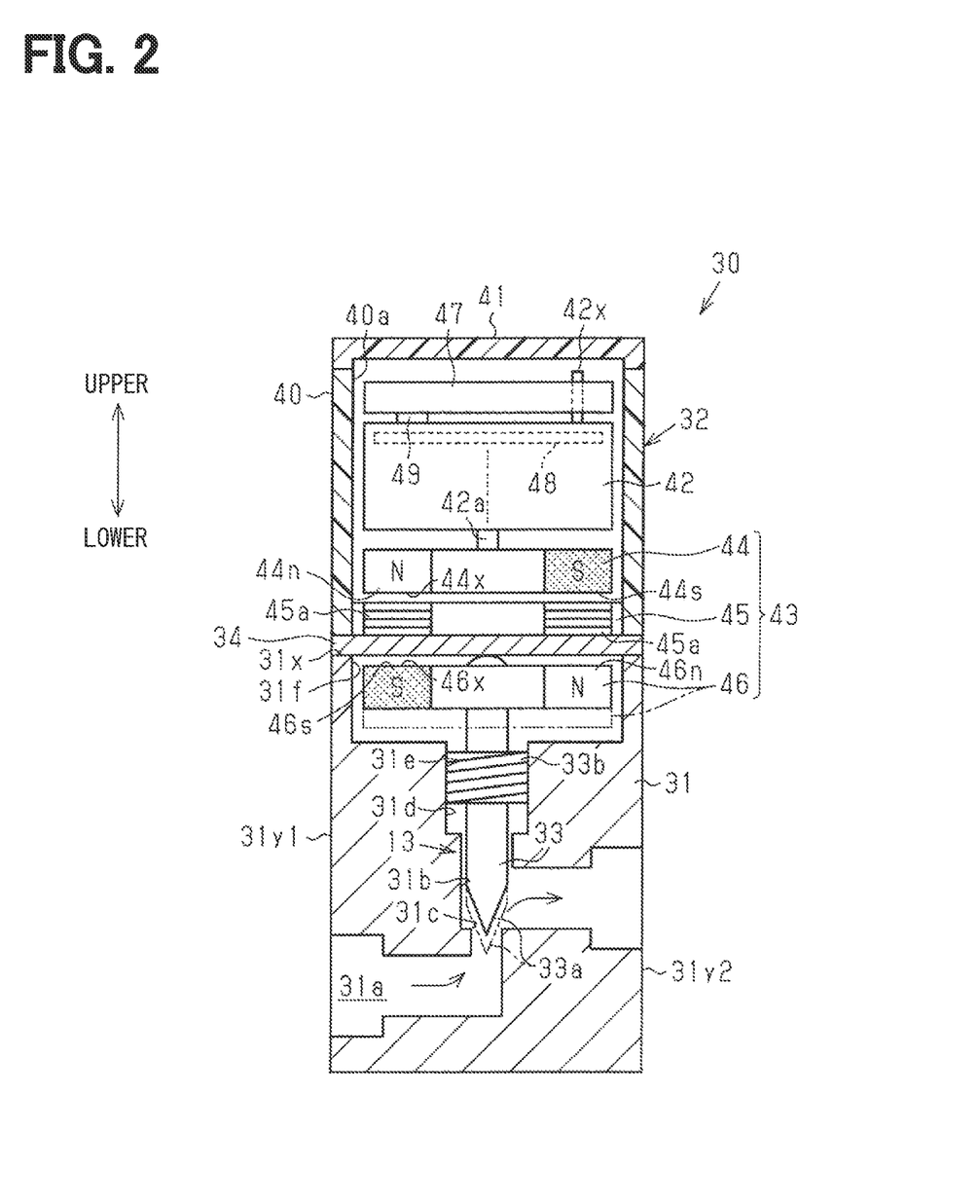
FIG. 2 is a schematic diagram showing an expansion valve device.

As shown in FIG. 2, the expansion valve device 30 includes a base block 31, an expansion valve 13 provided in the base block 31, and a drive device 32 that is integrally fixed to the base block 31 to drive the expansion valve 13.

The base block 31 is provided with an inflow path 31a that causes the refrigerant to flow from the second heat exchange portion 22 into the evaporator 14. The inflow path 31a functions as a part of the circulation path. The inflow path 31a has a circular passage shape in cross section. The base block 31 has a substantially rectangular parallelepiped shape. Assuming that one surface of the base block 31 on which the drive device 32 is fixed is an upper surface 31x (hereinafter, the base block 31 will be described as the lower side and the drive device 32 will be described as the upper side), the inflow path 31a is formed so as to penetrate from the side surface 31y1 on one side toward the side surface 31y2 on the opposite side.

In the middle of the inflow path 31a, a vertical passage 31b is provided to extend in the vertical direction orthogonal to the direction in which the inflow path 31a extends. The upper side of the vertical passage 31b communicates with a valve accommodating hole 31d having a circular cross section. A valve body 33 is accommodated in the valve accommodating hole 31d. The valve body 33 is a needle-shaped valve body and has a tip portion 33a pointed downward. That is, the expansion valve 13 includes a needle valve. The valve body 33 moves forward and backward along its own axial direction (vertical direction in FIG. 2), thereby to cause the tip portion 33a to open and close an opening 31c of the vertical passage 31b. In this way, the expansion valve 13 allows and disallows flow of refrigerant in the inflow path 31a and further adjusts the flow amount of refrigerant.

The valve body 33 includes the tip portion 33a, a male screw portion 33b located at the intermediate portion, and a driven-side rotary body 46 located at the base end portion. The driven-side rotary body 46 forms a part of a magnetic speed reduction unit 43 as described later. The male screw portion 33b is screwed with a female screw portion 31e formed on the inner peripheral surface of the valve accommodating hole 31d. The male screw portion 33b converts a rotary motion of the valve body 33 into a linear motion of the valve body 33 in the axial direction (vertical direction). The driven-side rotary body 46 is coaxially fixed to a base end portion of the valve body 33. The driven-side rotary body 44 is magnetically connected to a driving-side rotary body 44, which will be described later, via a magnetic transmission member 45 in a non-contact manner. That is, when the driven-side rotary body 46 rotates with the driving-side rotary body 44 via the magnetic transmission member 45 due to the rotary motion of the driving-side rotary body 44, the valve body 33 rotates accordingly. The magnetic speed reduction unit 43 functions as a transmission unit (magnetic transmission unit). The rotary motion of the valve body 33 is converted into the linear motion of the valve body 33 in the axial direction, that is, an opening and closing operation of the expansion valve 13, by using the male screw portion 33b and the female screw portion 31e.

A closing plate 34 for closing an opening 31f of the valve accommodating hole 31d is fixed to the upper surface 31x of the base block 31 with a fixing screw (not shown). The closing plate 34 has a flat plate shape made of metal (for example, made of SUS material). The closing plate 34 closes the opening 31f of the valve accommodating hole 31d in a liquid-tight manner and separates the valve accommodating hole 31d into which refrigerant flows from the drive device 32. That is, the closing plate 34 functions as a partition wall that tightly closes the opening 31f of the valve accommodating hole 31d of the base block 31. The closing plate 34 seals the opening 31f so that refrigerant does not leak to the outside (to the drive device 32 or the like) from the base block 31.

The drive device 32 is fixed to the upper surface 31x of the base block 31 by using mounting screws (not shown) or the like so as to interpose the closing plate 34 therebetween. The drive device 32 includes a housing 40 having an opening 40a on the upper surface thereof and a cover 41 that closes the opening 40a of the housing 40. The drive device 32 further includes an electric drive unit 42 accommodated in the housing 40, the driving-side rotary body 44, the magnetic transmission member 45, and a circuit board 47. The driving-side rotary body 44 and the magnetic transmission member 45 are a part of the magnetic speed reduction unit 43. The magnetic speed reduction unit 43 includes the driving-side rotary body 44, the magnetic transmission member 45, and the driven-side rotary body 46. The driven-side rotary body 46 is arranged not in the housing 40 but in the valve accommodating hole 31d.

The electric drive unit 42, the driving-side rotary body 44, and the magnetic transmission member 45 are provided on the axis of the valve body 33 (driven-side rotary body 46) of the expansion valve 13. The driving-side rotary body 44 is arranged below the electric drive unit 42, and the magnetic transmission member 45 is arranged below the driving-side rotary body 44.

The electric drive unit 42 includes, for example, a stepping motor, a brushless motor, or a motor with a brush, or the like. The electric drive unit 42 is connected to the circuit board 47 via multiple connection terminals 42x and receives electric power from the circuit board 47 via the connection terminals 42x. The electric drive unit 42 is rotationally driven based on the power supply from the circuit board 47 (control circuit) to rotate a rotary shaft 42a. Further, the electric drive unit 42 includes a detected object (sensor magnet) 48 that rotates integrally with the rotary shaft 42a. The rotary information (rotary position, speed, and the like) of the rotary shaft 42a is detected by detecting the detected object 48 by using a position detection unit (Hall IC) 49 of the circuit board 47. The rotary shaft 42a of the electric drive unit 42 projects from the lower side of its main body and is rotationally connected to the driving-side rotary body 44 of the magnetic speed reduction unit 43.

The magnetic speed reduction unit 43 is a magnetic speed reduction unit using the driving-side rotary body 44, the magnetic transmission member 45, and the driven-side rotary body 46. The magnetic speed reduction unit 43 also functions as a magnetic coupling. The magnetic speed reduction unit 43 decelerates and increases a torque of the rotation of the rotary shaft 42a of the electric drive unit 42 and transmits the torque to the valve body 33. The driving-side rotary body 44, the magnetic transmission member 45, and the driven-side rotary body 46 are coaxially arranged with the rotary shaft 42a and the valve body 33 so as to be arranged on the axis passing through the rotary shaft 42a of the electric drive unit 42 and the valve body 33. The magnetic transmission member 45 is arranged below the driving-side rotary body 44 that rotates integrally with the rotary shaft 42a, and the driven-side rotary body 46 is arranged below the magnetic transmission member 45. A magnetic opposed surface 44x of the driving-side rotary body 44 is opposed to the upper surface of the magnetic transmission member 45. A magnetic opposed surface 46x of the driven-side rotary body 46 is opposed to the lower surface of the magnetic transmission member 45 so as to interpose the closing plate 34 therebetween.

Figure 3:
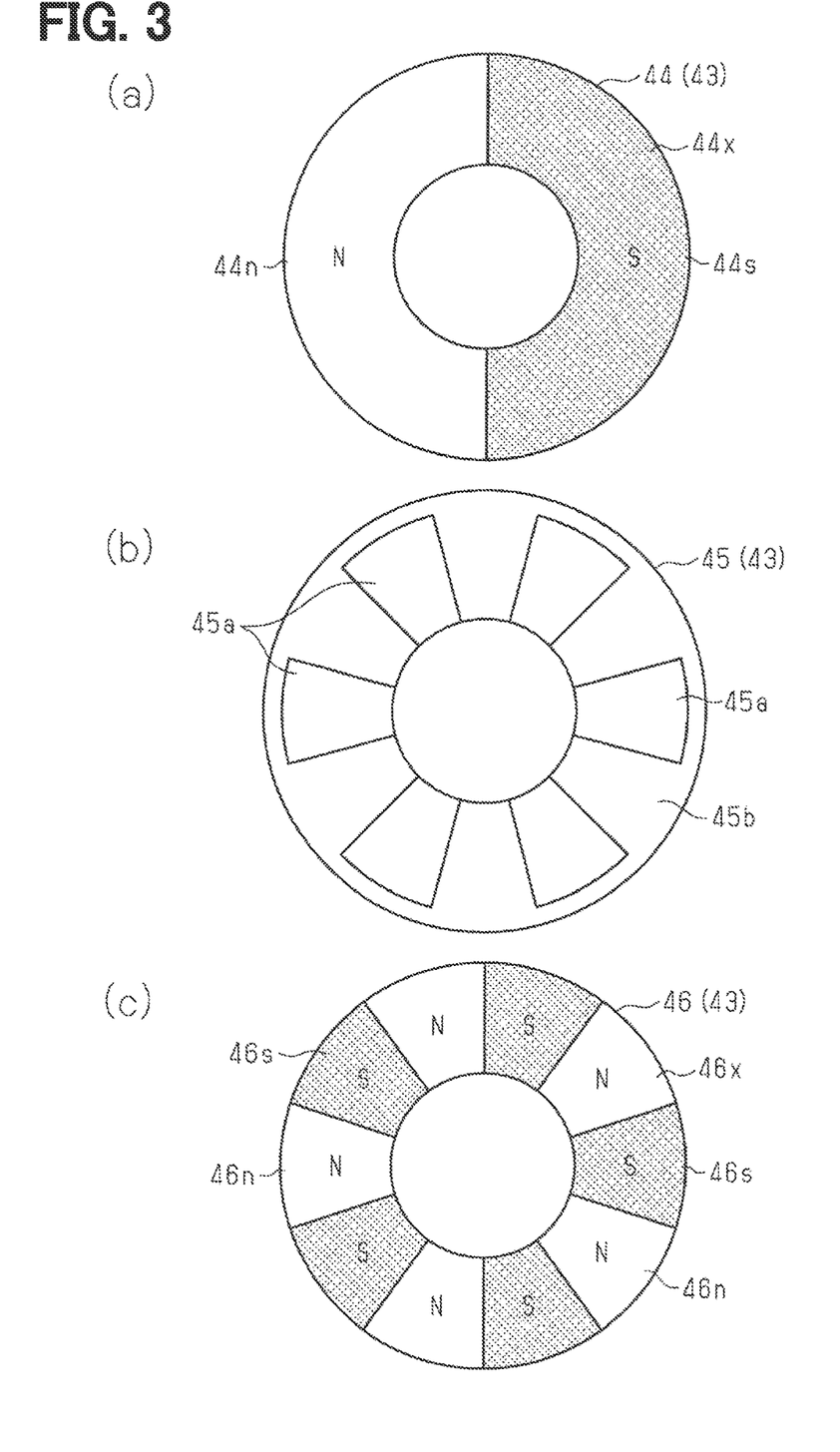

As shown in (a) in FIG. 3, the driving-side rotary body 44 is provided with a two-pole magnetic magnet pole including an N-pole magnetic pole 44n and an S-pole magnetic pole 44s in the radially outer annular region of the magnetic opposed surface 44x. The N-pole magnetic pole 44n and the S-pole magnetic pole 44s are provided at a constant angular interval of 180° angular ranges. The driving-side rotary body 44 is coaxially fixed to the rotary shaft 42a of the electric drive unit 42 so that the magnetic opposed surface 44x faces downward (see FIG. 2).

As shown in (b) in FIG. 3, six magnetic transmission bodies 45a are provided in the radially outer annular region on the upper surface of the magnetic transmission member 45. The six magnetic transmission bodies 45a are opposed to the magnetic poles 44n and 44s of the driving-side rotary body 44 in the axial direction. The six magnetic transmission bodies 45a are made of a magnetic metallic material. The six magnetic transmission bodies 45a are integrally built in a resin (non-magnetic) base member 45b so as to be spaced apart from each other at equal intervals. Each magnetic transmission body 45a is formed by laminating multiple magnetic metallic plates in the axial direction. Each magnetic transmission body 45a is insert-molded in the base member 45b or is separately assembled to the base member 45b. Further, each magnetic transmission body 45a is in a fan shape having an angular range of 30° and is arranged at intervals each corresponding to 30° with the adjacent magnetic transmission body 45a. That is, the magnetic transmission member 45 is formed such that the magnetic portions which are the magnetic transmission bodies 45a, respectively, and the non-magnetic portions which are the base members 45b, respectively, are alternately arranged at the constant angular intervals each being in a 30° angular range.

It is noted that, as shown in FIG. 2, the magnetic transmission member 45 is located on the bottom surface of the housing 40. The bottom surface of the housing 40 has an open shape and is closed with the closing plate 34. The magnetic transmission member 45 is arranged so that its lower surface abuts on the upper surface of the closing plate 34. The upper surface of the magnetic transmission member 45 is opposed to the magnetic opposed surface 44x on the lower surface of the driving-side rotary body 44 at a predetermined distance in the axial direction.

As shown in (c) in FIG. 3, the magnetic opposed surface 46x of the driven-side rotary body 46 has a radially outer annular region. The radially outer annular region of the magnetic opposed surface 46x is a radially outer annular region that is opposed to each of the magnetic transmission bodies 45a of the magnetic transmission member 45 in the axial direction. In the radially outer annular region of the magnetic opposed surface 46x, 10 magnetic poles in total, that is, 5 N-pole magnetic poles 46n and 5 S-pole magnetic poles 46s are alternately arranged at constant angular intervals of a 36° angular range. Unlike the magnetic transmission member 45 and the driving-side rotary body 44, which are housed in the housing 40 and located on the upper surface side of the closing plate 34, the driven-side rotary body 46 is accommodated in the valve accommodating hole 31d of the base block 31 near the lower surface of the closing plate 34 and is coaxially fixed to the valve body 33 so that the magnetic opposed surface 46x is directed upward.

Figure 4:
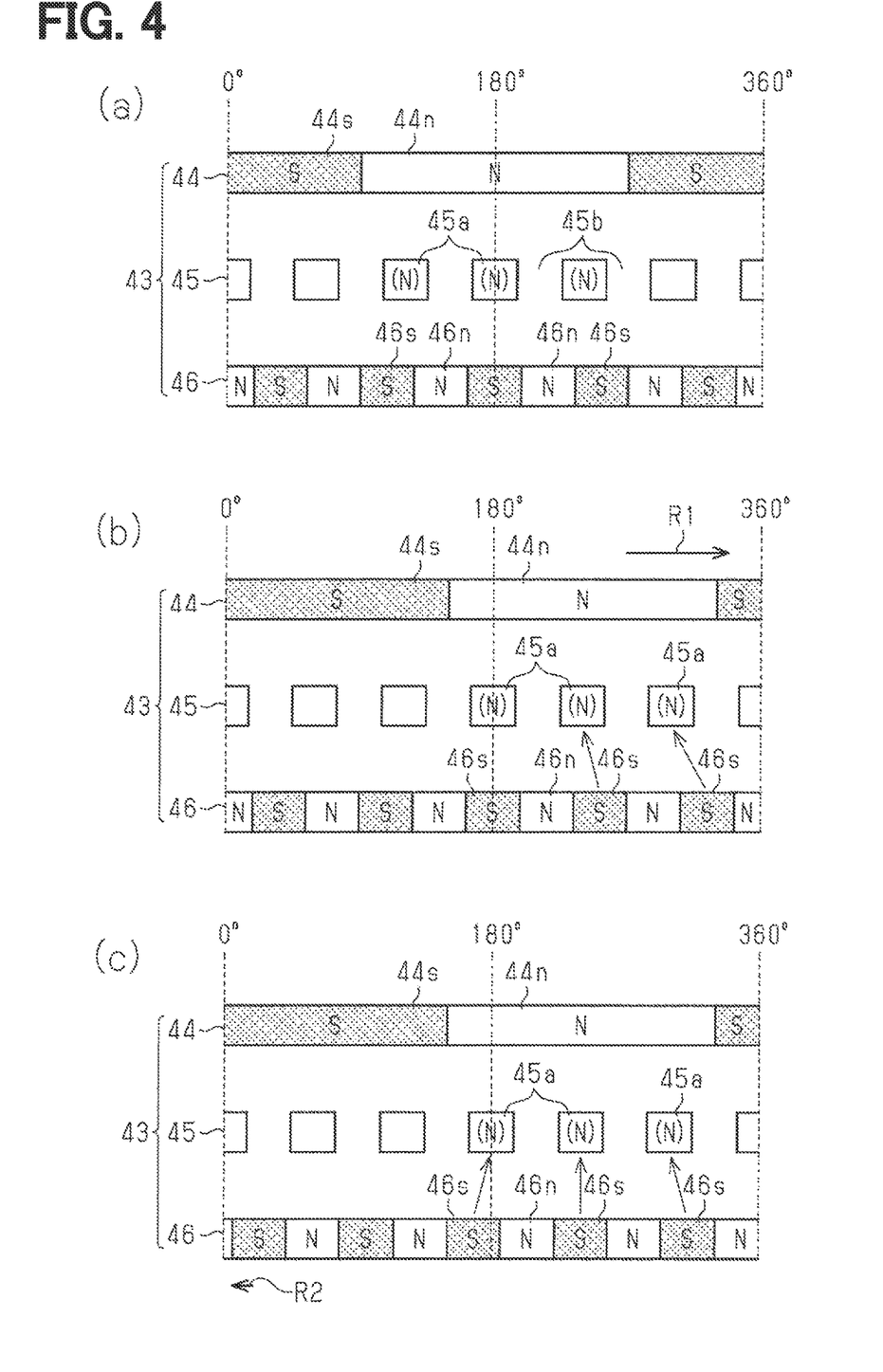

The magnetic speed reduction unit 43 having the configuration in this way operates as shown in (a) to (c) in FIG. 4. In the following, the N-pole magnetic pole 44n of the driving-side rotary body 44 will be mainly described. It is noted that, due to the configuration of the driving-side rotary body 44, the magnetic transmission member 45, and the driven-side rotary body 46 of the present embodiment, the N-pole magnetic pole 44n of the driving-side rotary body 44 having the 180° range is configured to correspond to an angular range in which the three of the magnetic transmission bodies 45a (magnetic parts) and the three of the non-magnetic parts in between are alternately continuous in the magnetic transmission member 45. In the driven-side rotary body 46, the three of the S-pole magnetic poles 46s and the two of the N-pole magnetic poles 44n are configured to correspond to the angle range in which the three of the magnetic transmission bodies 45a (magnetic parts) and the three of the non-magnetic parts are alternately continuous.

In the state shown in (a) in FIG. 4, three of the magnetic transmission bodies 45a of the magnetic transmission member 45 opposed to the N-pole 44n of the driving-side rotary body 44 are excited to be the N-pole, respectively. The center of the middle one of the three magnetic transmission bodies 45a in series is located at the magnetic center of the N-pole 44n. In this state, three of the magnetic transmission bodies 45a in series are opposed to three of the S-pole magnetic poles 46s in series among the S-pole magnetic poles 46s of the driven-side rotary body 46. Further, the center of the middle one of the magnetic poles 46s of the three S-pole magnetic poles 46s in series is located at the center of the middle one of the magnetic transmission bodies 45a. That is, the state shown in (a) in FIG. 4 is a stable state in which no rotational force acts on the driven-side rotary body 46. Subsequently, when the driving-side rotary body 44 is rotated by an amount corresponding to one magnetic transmission body 45a by driving of the electric drive unit 42 (arrow R1), the state shown in (b) in FIG. 4 is made.

In the state shown in (b) in FIG. 4, the three magnetic transmission bodies 45a in series, which are displaced by one of the magnetic transmission body 45a with respect to the three of the magnetic transmission bodies 45a in series shown in (a) in FIG. 4, are opposed to the N-pole magnetic pole 44n of the driving-side rotary body 44A. The center of the middle one of the three magnetic transmission bodies 45a in series is located at the magnetic center of the N-pole 44n to which the three magnetic transmission bodies 45a in series are opposed. In this state, the three S-pole magnetic poles 46s of the driven-side rotary body 46 are opposed to the three magnetic transmission bodies 45a in series. However, the center of the S-pole magnetic pole 46s among the three S-pole poles 46s at the end opposite to the rotational direction of the driving-side rotary body 44 is located at the center of the magnetic transmission body 45a. As shown in (c) in FIG. 4, a rotational force in the direction opposite to the rotational direction of the driving-side rotary body 44 acts on the driven-side rotary body 46, such that the center of the S-pole magnetic pole 46s that is the middle one among the three S-pole magnetic poles 46s is located at the center of the magnetic transmission body 45a that is the middle one among the three magnetic transmission bodies 45a. As a result, the driven-side rotary body 46 rotates in the direction opposite to the rotational direction of the driving-side rotary body 44A (arrow R2).

The operations of (a) to (c) in FIG. 4 are drawn to facilitate understanding of the rotational structure of the magnetic speed reduction unit 43 (the driving-side rotary body 44, the magnetic transmission member 45 and the driven-side rotary body 46). In particular, the state shown in (b) in FIG. 4 depicts a state in which the driven-side rotary body 46 is stopped even though the driving-side rotary body 44 rotates. In reality, as the driving-side rotary body 44 rotates, the driven-side rotary body 46 immediately follows the rotation, and the driven-side rotary body 46 smoothly rotates. Further, the S-pole magnetic pole 44s also performs the same operation as that of the N-pole magnetic pole 44n.

The driving-side rotary body 44 continuously rotates thereby to repeat the above operation. Thus, the driven-side rotary body 46 rotates, following the driving-side rotary body 44, in the direction opposite to that of the driving-side rotary body 44. In this case, when the driving-side rotary body 44 rotates the magnetic transmitting member 45 by one of the magnetic transmitting bodies 45*a*, that is, by 60°, the driven-side rotary body 46 rotates in the opposite direction by one of the S-pole magnetic poles 46*s*, that is, by only 12°. That is, the rotation ratio (reduction ratio) between the driving-side rotary body 44 and the driven-side rotary body 46 is set to "5:1". The rotation of the driving-side rotary body 44 is decelerated and increased in torque in the process of being transmitted to the driven-side rotary body 46 via the magnetic transmission member 45.

The magnetic speed reduction unit 43 is, unlike a well-known gear reduction mechanism which is configured to decelerate and transmit a driving force by meshing multiple gears, has a structure that is configured to enable non-contact drive transmission by magnetic deceleration. Therefore, the configuration enables significantly quietness during its transmission of the driving force. Further, the configuration enables to perform the transmission of a driving force between the driving-side rotary body 44 and the driven-side rotary body 46 in a non-contact manner. Therefore, in the present embodiment, the configuration enables to interpose the closing plate 34 between the magnetic transmission member 45 and the driven-side rotary body 46. In addition, the configuration enables to cause the closing plate 34 to close the opening 31*f* of the valve accommodating hole 31*d* of the base block 31 in a liquid-tight manner. That is, the configuration forms the liquid-tight structure with the closing plate 34 that steadily restricts intrusion of the refrigerant into the electric drive unit 42 (inside the drive device 32) through the drive transmission path that likely becomes an intrusion path of the refrigerant.

The circuit board 47 is arranged in the vicinity of the opening 40*a* of the housing 40. The circuit board 47 is mounted with various electronic components (not shown) to form the control circuit that controls the driving of the electric drive unit 42. The circuit board 47 is arranged so that its plane direction is orthogonal to the axial direction of the electric drive unit 42.

The control circuit (circuit board 47) controls the rotation and driving of the electric drive unit 42, thereby to adjust the advancing or retreating position of the valve body 33 of the expansion valve 13 via the magnetic speed reduction unit 43 and to adjust an amount of refrigerant supplied to the evaporator 14. That is, the control circuit (circuit board 47) controls the opening and closing of the expansion valve 13 (expansion valve device 30) in conjunction with the integrated valve device 24 of the vehicle air conditioner, thereby to perform the air conditioning control together with a control circuit that controls the integrated valve device 24.

The effects of this embodiment will be described.

(1) The magnetic speed reduction unit 43 decelerates the rotation of the rotary shaft 42*a* of the electric drive unit (motor) 42. The number of the magnetic magnet poles (magnetic poles 44*n*, 44*s*) of the driving-side rotary body 44 is set to, for example, "2". The number of the magnetic transmission bodies 45*a* of the magnetic transmission member 45 is set to, for example, "6". The number of the magnetic magnet poles (magnetic poles 46*n*, 46*s*) of the driven-side rotary body 46 is set to, for example, "10". The magnetic speed reduction unit 43 is enabled to perform the magnetic deceleration by setting those numbers. The magnetic speed reduction unit 43 transmits the rotation of the driving-side rotary body 44 to the driven-side rotary body 46 via the magnetic transmission member 45 in a non-contact manner. Therefore, the configuration may enable to provide the highly quiet expansion valve device 30 that is significantly quiet during transmission of a driving force.

(2) In the magnetic speed reduction unit 43, the driving-side rotary body 44, the magnetic transmission member 45, and the driven-side rotary body 46 are opposed to each other in the axial direction. Therefore, the configuration enables to contribute to downsizing of the magnetic speed reduction unit 43 in the direction orthogonal to the axial direction (radial direction) and eventually to downsizing of the drive device 32 (expansion valve device 30) in the same direction.

(3) The opening 31*f* of the valve accommodating hole 31*d* is liquid-tightly closed with the closing plate 34. Specifically, the closing plate 34 is interposed between the driving-side rotary body 44 and the magnetic transmission member 45, which are provided in the drive device 32, and the driven-side rotary body 46 provided in the base block 31. Therefore, the structure using the magnetic speed reduction unit 43 and the closing plate 34, which also function as a magnetic coupling, enables to more reliably restrict infiltration of the refrigerant into the electric drive unit 42 (inside the drive device 32) through the drive transmission path which is likely to become the infiltration path of the refrigerant. As a result, the configuration enables to restrict corrosion of the magnetic transmission member 45 due to the refrigerant. In the magnetic speed reduction unit 43, the driving-side rotary body 44, the magnetic transmission member 45, and the driven-side rotary body 46 are opposed to each other in the axial direction. Therefore, the configuration enables to form a structure in which the closing plate 34 is interposed between the magnetic transmission member 45 and the driven-side rotary body 46. Thus, the closing plate 34 in the flat plate-shape can be used as in the present embodiment.

(4) In the magnetic transmission member 45, the multiple magnetic transmission bodies 45*a* are integrally built in the resin base member 45*b*. Therefore, the configuration enables to assemble the magnetic transmission member 45 to the expansion valve device 30 (drive device 32).

(5) The configuration converts the rotation of the electric drive unit (motor) 42 into the linear motion (advance and retreat operation) of the valve body 33 via the magnetic speed reduction unit 43 and the screw mechanism (the male screw portion 33*b* and the female screw portion 31*e*). The configuration enables to act the attractive force generated in the magnetic speed reduction unit 43 (that is, the attractive force between the driving-side rotary body 44, the magnetic transmission member 45, and the driven-side rotary body 46) to the screw mechanism (screw portions 33*b*, 31*e*) that is structurally rattling. Therefore, the configuration enables to suppress the rattling of the screw mechanism (screw portions 33*b*, 31*e*) and the rattling of the valve body 33 without using an urging component.

(6) The base block 31 has the inflow path 31*a* which is a part of the circulation path of the refrigeration cycle device D and accommodates the expansion valve 13. The drive device 32 is integrally fixed to the base block 31 to form a component unit. Therefore, the configuration may enable to facilitate assembling of the expansion valve device 30 and the like.

(7) In the housing 40, the distance between the circuit board 47 and the base block 31 is longer than the distance between the electric drive unit 42 and the base block 31. That is, the circuit board 47 is arranged at a position (on the side of the opening 40*a*) away from the base block 31 having the refrigerant circulation path. Therefore, in the structure in which the circuit board 47 is arranged on the upper side, even in a case where the refrigerant infiltrates into the housing 40, the configuration enables to restrict infiltration of the refrigerant to the circuit board 47 and to protect the circuit board 47 from damage.

The above described embodiments may be modified as follows. The above described embodiments and the following modifications can be implemented in combination with one another as long as there is no technical contradiction.

The magnetic poles 44n and 44s of the driving-side rotary body 44, the magnetic transmitting bodies 45a of the magnetic transmitting member 45, and the magnetic poles 46n and 46s of the driven-side rotary body 46 have been set to "2", "6" and "10", respectively, to form the magnetically decelerating configuration. It is noted that, the numbers described above are examples and may be modified as appropriate.

The magnetic poles 44n, 44s, 46n, 46s provided on the magnetic opposed surfaces 44x, 46x of the driving-side rotary body 44 and the driven-side rotary body 46 have not been specifically mentioned, however, those may be mainly formed of an anisotropic magnet that generates magnetic poles on the magnetic opposed surfaces 44x and 46x. The configuration employing the anisotropic magnet does not require a back yoke and the like for the driving-side rotary body 44 and the driven-side rotary body 46, thereby to enable to reduce the number of components. In addition, magnetic magnet poles having another configurations, such as a general magnet in which the magnetic poles are axially oriented and in which the magnetic poles appear on the front and back surfaces of the driving-side rotary body 44 and the driven-side rotary body 46 may be used.

The magnetic transmission member 45 is formed by integrally building the multiple magnetic transmission bodies 45a into the resin base member 45b, however, the configuration may be appropriately changed by, such as, arranging the multiple magnetic transmission bodies 45a individually.

The magnetic transmission member 45 is arranged on the side of the driving-side rotary body 44 relative to the closing plate 34. It is noted that, the magnetic transmission member 45 may be arranged on the side of the driven-side rotary body 46 relative to the closing plate 34. Although the magnetic transmission member 45 is exposed to the refrigerant, the size of the drive device 32 may be reduced.

The driving-side rotary body 44, the magnetic transmission member 45, and the driven-side rotary body 46 are opposed to each other in the axial direction, however, those may be opposed to each other in the radial direction. In this case, the closing plate 34 may be required to modify its shape, such that, for example, a part of the closing plate 34 is interposed between the magnetic transmission member 45 and the driven-side rotary body 46 which are opposed to each other in the radial direction.

The magnetic speed reduction unit 43 decelerates the rotation caused by the driving of the electric drive unit (motor) 42, however, the magnetic speed reduction unit 43 may be applied to a magnetic transmission unit including a magnetic acceleration unit that accelerates the rotation caused by the driving of the electric drive unit (motor) 42.

The circuit board 47 is arranged near the opening 40a of the housing 40 and above the electric drive unit 42, however, the present disclosure is not limited to this configuration. For example, the circuit board 47 may be arranged such that its plane direction is along the vertical direction. In this case, the circuit board 47 may be arranged along the lateral surface of the housing 40.

In the expansion valve device 30, the base block 31 is arranged on the lower side, and the drive device 32 is arranged on the upper side, however, the arrangement structure is not limited to this and may be appropriately modified.

The present disclosure may be applied to valves other than the expansion valve device 30 (expansion valve 13) and may be applied to, for example, the integrated valve device 24 in the refrigeration cycle device D of the embodiment.

The present disclosure is applied to the refrigeration cycle device D for a vehicle air conditioner, however, the present disclosure may be applied to a valve device used in a refrigerant circulation path of another refrigeration cycle device, such as a refrigeration cycle device for an air conditioner other than that for a vehicle, a refrigeration cycle device for battery cooling other than that for air conditioning, and the like.

Although the present disclosure has been described in accordance with the examples, it is understood that the present disclosure is not limited to such examples or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A valve device comprising:
a valve configured to change a flow mode of refrigerant that flows in a circulation path of a refrigeration cycle device;
a drive device configured to drive the valve and including an electric drive unit as a drive source; and
a transmission unit provided in a drive transmission path that is from the electric drive unit to the valve, the transmission unit configured to change speed of rotation caused by driving of the electric drive unit, wherein
the transmission unit is a magnetic variable speed unit including a driving-side rotary body, a magnetic transmission member, and a driven-side rotary body,
the driving-side rotary body is configured to rotate by driving of the electric drive unit,
the driving-side rotary body includes a plurality of magnetic magnet poles in a rotational direction,
the magnetic transmission member includes a plurality of magnetic transmission bodies configured to be magnetized by the plurality of magnetic magnet poles of the driving-side rotary body,
the plurality of magnetic transmission bodies are apart from each other in the rotational direction,
the driven-side rotary body includes a plurality of magnetic magnet poles in the rotational direction,
the driven-side rotary body is configured to rotate in response to a rotary motion of the plurality of magnetic magnet poles of the driving-side rotary body via the magnetic transmission member,
a number of the plurality of magnetic magnet poles and a number of the plurality of magnetic transmission bodies are different from each other in the magnetic transmission unit to enable the magnetic transmission unit to reduce or increase in speed of rotation,
the magnetic transmission unit is configured to transmit the rotation of the driving-side rotary body to the driven-side rotary body via the magnetic transmission member in a non-contact manner, and the transmission unit is configured such that the driving-side rotary body, the magnetic transmission member, and the driven-side rotary body are opposed to each other in an axial direction, the valve device further comprising:

a base block that is a part of the circulation path and has a valve accomodating hole that accomodates a valve body of the valve; and a closing plate that liquid-tightly closes an opening of the valve accomodating hole, wherein the closing plate is interposed between a group, which includes the driving-side rotary body and the magnetic transmission member provided in the drive device, and the driven-side rotary body provided in the base block.

2. The valve device according to claim 1, wherein the magnetic transmission member is formed such that the plurality of magnetic transmission bodies are integrally built in a non-magnetic base member.

3. The valve device according to claim 1, wherein each of the driving-side rotary body and the driven-side rotary body has a magnetic opposed surface that is opposed to the magnetic transmission member, the plurality of magnetic magnet poles are provided on the magnetic opposed surface of the driving-side rotary body, the plurality of magnetic magnet poles are provided on the magnetic opposed surface of the driven-side rotary body, and the plurality of magnetic magnet poles are mainly formed of an anisotropic magnet that is configured to cause magnetic poles to appear on the magnetic opposed surface.

4. The valve device according to claim 1, further comprising:

a screw mechanism configured to convert the rotary motion of the driven-side rotary body of the transmission unit into an axial linear motion of a valve body of the valve, wherein the valve device is configured to change a flow mode of refrigerant with the linear motion of the valve body via the transmission unit and the screw mechanism caused by driving of the electric drive unit.

5. The valve device according to claim 1, wherein the refrigeration cycle device is a vehicular refrigeration cycle device mounted on a vehicle.

6. The valve device according to claim 1, wherein each of the driving-side rotary body and the driven-side rotary body has a magnetic opposed surface that is opposed to the magnetic transmission member, the plurality of magnetic magnet poles are provided on the magnetic opposed surface of the driving-side rotary body, the plurality of magnetic magnet poles are provided on the magnetic opposed surface of the driven-side rotary body, and the plurality of magnetic magnet poles are mainly formed of an anisotropic magnet that is configured to cause magnetic poles to appear on the magnetic opposed surface along the axial direction.

7. The valve device according to claim 6, wherein the driving-side rotary body is provided with an N-pole magnetic pole and an S-pole magnetic pole, each of the N-pole magnetic pole and the S-pole magnetic pole is configured to correspond to an angular range in which three magnetic transmission bodies and three non-magnetic portions in between are alternately continuous in the magnetic transmission member, and the N-pole magnetic pole and the S-pole magnetic pole are configured to be opposed to the three of the magnetic transmission bodies and three non-magnetic portions in the axial direction.

8. The valve device according to claim 7, wherein the N-pole magnetic pole and the S-pole magnetic pole are provided at an interval of 180° angular ranges.

9. The valve device according to claim 1, wherein the closing plate is flat and axially interposed between the group including the driving-side rotary body and the magnetic transmission member provided in the drive device, and the driven-side rotary body provided in the base block.

10. The valve device according to claim 1, wherein the closing plate is arranged in a single plane interposed in the axial direction between the group including the driving-side rotary body and the magnetic transmission member provided in the drive device, and the driven-side rotary body provided in the base block.

11. The valve device according to claim 1, wherein the closing plate is a flat sealing plate arranged in a single plane axially disposed above the driven-side rotary body.

* * * * *